(12) United States Patent
Kim et al.

(10) Patent No.: US 12,068,257 B1
(45) Date of Patent: Aug. 20, 2024

(54) INTEGRATED CIRCUIT (IC) STRUCTURE PROTECTION SCHEME

(71) Applicant: XILINX, INC., San Jose, CA (US)

(72) Inventors: Myongseob Kim, Pleasanton, CA (US); Henley Liu, San Jose, CA (US); Yun Wu, San Jose, CA (US); Cheang Whang Chang, Mountain View, CA (US)

(73) Assignee: XILINX, INC., San Jose, CA (US)

( * ) Notice: Subject to any disclaimer, the term of this patent is extended or adjusted under 35 U.S.C. 154(b) by 97 days.

(21) Appl. No.: 17/136,721

(22) Filed: Dec. 29, 2020

(51) Int. Cl.
*H01L 23/552* (2006.01)
*H01L 21/50* (2006.01)
*H01L 23/528* (2006.01)

(52) U.S. Cl.
CPC ........... *H01L 23/552* (2013.01); *H01L 21/50* (2013.01); *H01L 23/528* (2013.01)

(58) Field of Classification Search
CPC ......... H01L 2924/3025; H01L 2924/00; H01L 21/6835; H01L 2924/14; H01L 25/0657; H01L 25/043; H01L 25/074; H01L 25/0756; H01L 25/117; H01L 2224/08145; H01L 23/552–556; H01L 23/573
See application file for complete search history.

(56) References Cited

U.S. PATENT DOCUMENTS

| | | | |
|---|---|---|---|
| 6,781,226 B2 | 8/2004 | Huppenthal et al. | |
| 7,126,214 B2 | 10/2006 | Huppenthal et al. | |
| 7,282,951 B2 | 10/2007 | Huppenthal et al. | |
| RE42,035 E | 1/2011 | Huppenthal et al. | |
| 7,966,666 B2 | 6/2011 | Walker et al. | |
| 9,704,817 B2 | 7/2017 | Knowles et al. | |
| 10,276,619 B2* | 4/2019 | Kao | H01L 23/481 |
| 2018/0138130 A1* | 5/2018 | Lin | H01L 24/16 |
| 2020/0328162 A1* | 10/2020 | Haba | H01L 24/83 |
| 2020/0328164 A1* | 10/2020 | DeLaCruz | H01L 22/34 |
| 2021/0028087 A1* | 1/2021 | Kothari | H01L 23/36 |
| 2021/0050303 A1* | 2/2021 | Chien | H01L 25/0657 |
| 2022/0108936 A1* | 4/2022 | Yoshimi | H01L 23/3675 |

FOREIGN PATENT DOCUMENTS

TW    201110311 A  *  3/2011  .........  H01L 21/6835

* cited by examiner

*Primary Examiner* — Younes Boulghassoul
*Assistant Examiner* — Quinton A Brasfield
(74) *Attorney, Agent, or Firm* — Patterson + Sheridan, LLP

(57) ABSTRACT

Some examples described herein relate to protecting an integrated circuit (IC) structure from imaging or access. In an example, an IC structure includes a semiconductor substrate, an electromagnetic radiation blocking layer, and a support substrate. The semiconductor substrate has a circuit disposed on a front side of the semiconductor substrate. The electromagnetic radiation blocking layer is disposed on a backside of the semiconductor substrate opposite from the front side of the semiconductor substrate. The support substrate is bonded to the semiconductor substrate. The electromagnetic radiation blocking layer is disposed between the semiconductor substrate and the support substrate.

15 Claims, 10 Drawing Sheets

INTEGRATED CIRCUIT (IC) STRUCTURE PROTECTION SCHEME

TECHNICAL FIELD

Examples of the present disclosure generally relate to protecting an integrated circuit (IC) structure from imaging or access.

BACKGROUND

Integrated circuits (ICs) are ubiquitous in current society and economy. ICs implemented as IC structures, such as dies or chips, usually represent large investments to bring those ICs to market. Significant costs are incurred in the processes of designing a circuit, verifying the circuit, transforming that circuit into a physical implementation, synthesizing and verifying the physical implementation, taping out the physical implementation, and fabricating the physical implementation. Accordingly, an IC can embody intellectual property (IP) that is highly valuable and that is in the form of physical structures on an IC structure. Further, in addition to the physical structures, some IC structures can be programmable, and the data that those IC structures are programmed to store can be IP that is highly valuable. The data can represent programs, kernels, or designs that resulted from significant programming, verification, and compiling efforts. Therefore, protecting the physical structures and data on an IC structure from being imaged or accessed by an adverse entity, such as a competitor, when the IC structure is provided on the market is desirable.

SUMMARY

Some examples described herein relate to protecting an integrated circuit (IC) structure from imaging or access. An electromagnetic radiation blocking layer can be implementing on a backside of a semiconductor substrate, where a circuit is disposed on a front side of the semiconductor substrate. The electromagnetic radiation blocking layer can prevent imaging or accessing of the circuit from the backside of the semiconductor substrate, among other advantages.

An example of the present disclosure is an IC structure. The IC structure includes a semiconductor substrate, an electromagnetic radiation blocking layer, and a support substrate. The semiconductor substrate has a circuit disposed on a front side of the semiconductor substrate. The electromagnetic radiation blocking layer is disposed on a backside of the semiconductor substrate opposite from the front side of the semiconductor substrate. The support substrate is bonded to the semiconductor substrate. The electromagnetic radiation blocking layer is disposed between the semiconductor substrate and the support substrate.

Another example of the present disclosure is a method for forming an IC structure. A circuit is formed on a front side of a semiconductor substrate. A support substrate is bonded to a backside of the semiconductor substrate opposite from the front side of the semiconductor substrate. An electromagnetic radiation blocking layer is disposed between the semiconductor substrate and the support substrate.

A further example of the present disclosure is a method for forming an IC structure. A circuit is formed on a front side of a semiconductor substrate. The semiconductor substrate is thinned from a backside of the semiconductor substrate opposite from the front side of the semiconductor substrate. An electromagnetic radiation blocking layer is formed on the backside of the semiconductor substrate. After forming the electromagnetic radiation blocking layer, a support substrate is bonded to the backside of the semiconductor substrate. The electromagnetic radiation blocking layer is disposed between the semiconductor substrate and the support substrate.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
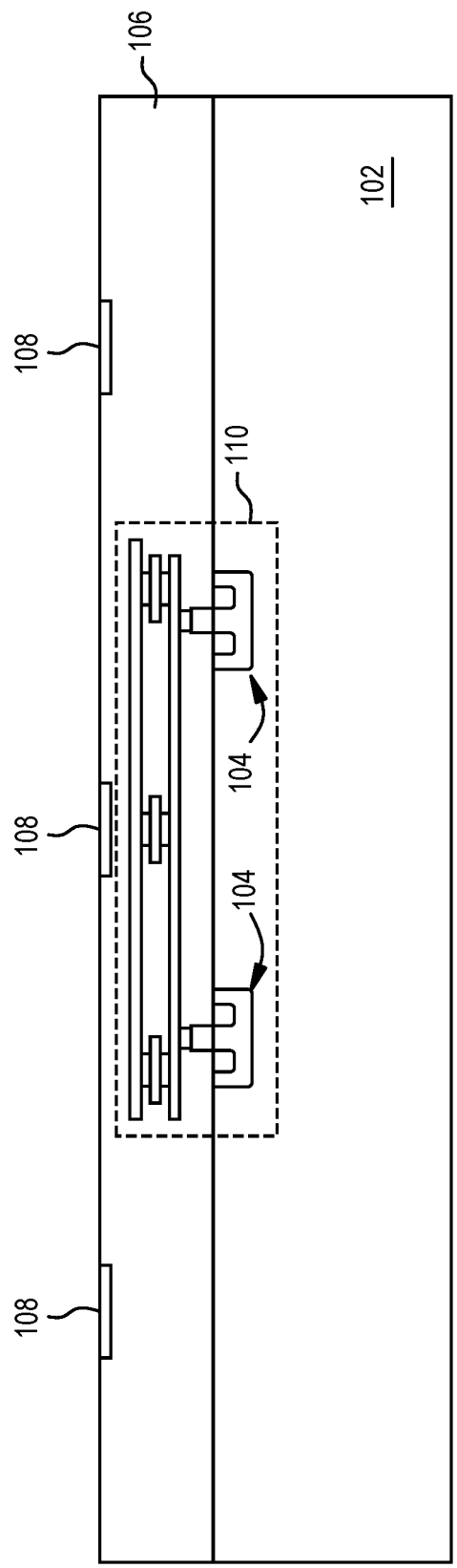
FIGS. 1, 2, 3, 4A, 4B, 5, 6, and 7 are cross-sectional views of respective structures during processing to form an integrated circuit (IC) structure having a protection scheme according to some examples.

Some examples described herein relate to protecting an integrated circuit (IC) structure from imaging or access. Generally, a semiconductor substrate, on which a circuit is formed on a front side, can be thinned from a backside and has an electromagnetic radiation blocking layer disposed on the backside. A support substrate can be bonded to the backside of the semiconductor substrate to provide mechanical support to the semiconductor substrate. The circuit can include physical features that can be valuable intellectual property (IP), and in some instances, can be programmable such that data stored by the circuit can also be valuable IP. The electromagnetic radiation blocking layer can be any material that is opaque to electromagnetic radiation of a target wavelength or wavelength within a subset of the spectrum of electromagnetic radiation (e.g., infrared (IR) light) and/or that diffuses such electromagnetic radiation sufficiently to obscure features attempted to be imaged or accessed by such electromagnetic radiation through the electromagnetic radiation blocking layer. Although the electromagnetic radiation blocking layer can be opaque or can diffuse some electromagnetic radiation (e.g., a subset of the spectrum), the electromagnetic radiation blocking layer may be transparent to other electromagnetic radiation (e.g., outside of that subset of the spectrum).

To access the physical features or data on the circuit, an adverse entity would have to remove the electromagnetic radiation blocking layer, which in some instances, would require removing the support substrate. It is contemplated that removing the electromagnetic radiation blocking layer and support substrate would render the IC structure fragile, such that the semiconductor substrate would likely break. The breaking of the semiconductor substrate would therefore prevent an adverse entity from imaging the features of the circuit or accessing data stored on the circuit.

IC structures that are available on the market can be susceptible to adverse entities reverse engineering the IC structures and any data stored on the IC structures. By reverse engineering the IC structures, the adverse entity may be able to recreate the IC structure so that the adverse entity can implement the IP implemented by the IC structure without having to incur the same significant costs in independently researching and developing other IP. Even further, emerging paradigms are increasing a need for security for devices and the IP that are on those devices. Third party data centers and cloud computing permit a user to use resources owned and operated by a third party. Field programmable gate array (FPGA) devices are increasingly being used in such data centers and for cloud computing. The FPGA devices can be offered to users as FPGA-as-a-Service (FaaS). In such instances, a user can implement its user design on an FPGA device owned and operated by a third party. The user design can include IP owned by the user. The user generally does not control physical access to the FPGA device. Controlling physical access to the FPGA device can be a significant limitation on an ability to secure the IP that is instantiated on the FPGA device from an adverse entity attempting to illicitly obtain that IP, even if the IP is encoded or encrypted.

Semi-invasive techniques for reverse engineering can include using electromagnetic radiation to image or access physical structures or data on an IC structure. Some techniques include contactless probing (such as laser voltage probing) and IR checking. These techniques capitalize on the transparency of a semiconductor substrate on which the circuit is formed to view the circuits or characteristics of the circuit from a backside of the semiconductor substrate and through the semiconductor substrate. Various examples attempt to prevent such techniques by implementing an electromagnetic radiation blocking layer on the backside of a semiconductor substrate. The electromagnetic radiation blocking layer, when present, can prevent attempts at using these techniques from being successful. If an adverse entity attempts to remove the electromagnetic radiation blocking layer to attempt using these techniques, the semiconductor substrate can be rendered lacking sufficient structural integrity and can break, thereby preventing the adverse entity from successfully using these techniques.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

As used herein, when a first component is described as being on a second component, such description contemplates that the first component may be directly on the second component and that, e.g., the first component may be directly on a third (intervening) component that is directly on the second component. Additionally, components that are described as being bonded together may be directly bonded together or indirectly bonded together through, e.g., one or more layers formed on the respective components that are directly bonded together.

FIGS. 1 through 7 illustrate cross-sectional views of respective structures during processing to form an IC structure having a protection scheme according to some examples. Referring to FIG. 1, front side processing is performed on a semiconductor substrate 102. The semiconductor substrate 102 can be any appropriate semiconductor substrate, such as a bulk semiconductor substrate, a semiconductor-on-insulator (SOI) substrate, or the like. In some examples, the semiconductor substrate 102 is a bulk silicon wafer. The front side processing includes forming devices 104 on the front side of the semiconductor substrate 102. The devices 104 can include transistors, such as field effect transistors (FETs), and more particularly, planar or fin FETs. As illustrated but not specifically referenced, each device 104 is a transistor and includes two source/drain regions disposed in the semiconductor substrate 102 and a gate structure on the semiconductor substrate 102 disposed laterally between the two source/drain regions.

An interconnect structure 106 is formed on the front side of the semiconductor substrate 102. The interconnect structure 106 includes a number of metal layers and dielectric layers. Each metal layer can include metal lines, metal vias, metal contacts, or any other metal feature. Each metal layer can be formed in a corresponding dielectric layer. Each dielectric layer may be referred to as an inter-layer dielectric (ILD), an inter-metal dielectric (IMD), or the like. An outer metal layer of the interconnect structure 106 is illustrated as including metal features 108 that will subsequently be electrically connected to exterior electrical connectors.

The various metal features in the interconnect structure 106 can be electrically connected together and to various devices 104 to form a circuit. A circuit 110 is schematically outlined in the structure shown in FIG. 1 and includes various devices and metal features. The circuit 110 is to be protected by the protection scheme.

Figure 2:
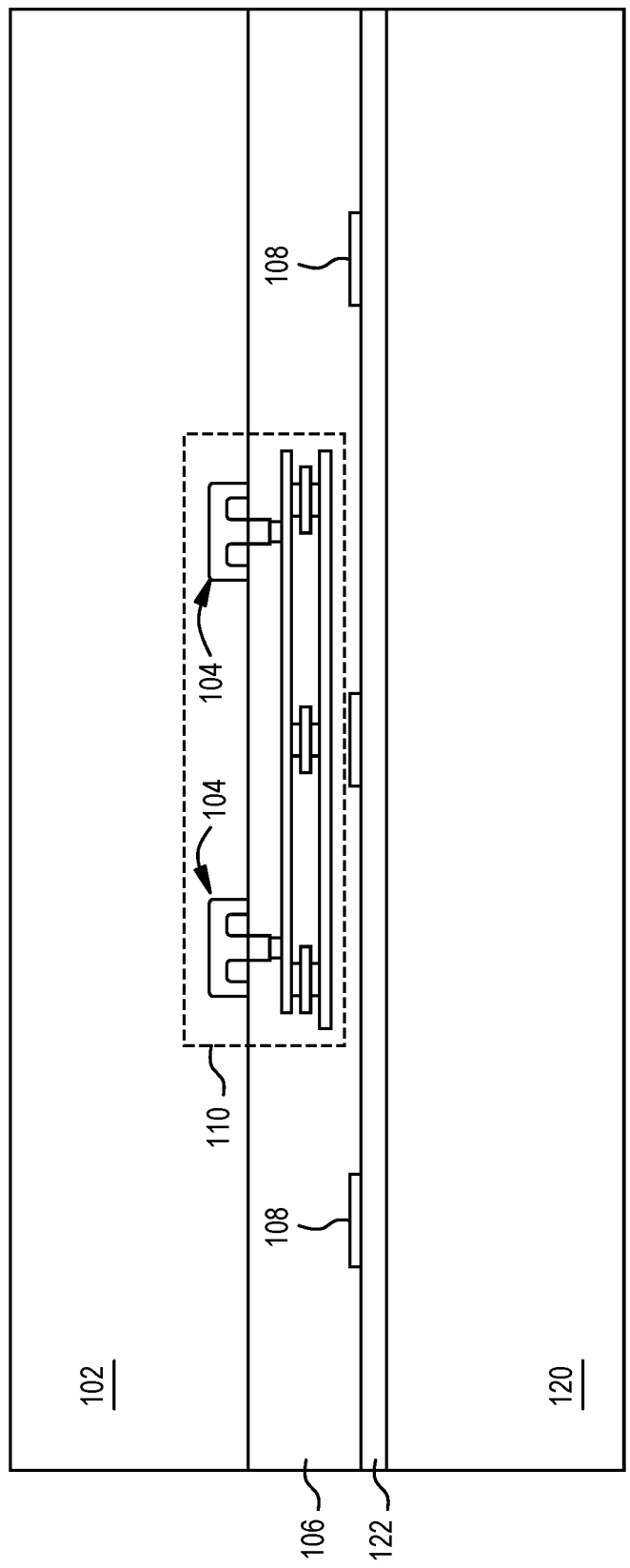

Referring to FIG. 2, the front side of the structure of FIG. 1 is adhered to a carrier substrate 120 by an adhesive 122. The adhesive 122 adheres the interconnect structure 106 to the carrier substrate 120. The carrier substrate 120 can be any carrier substrate that is capable of providing mechanical support to the semiconductor substrate 102 and structures formed thereon during backside processing of the semiconductor substrate 102. Examples of the carrier substrate 120 include a glass carrier substrate, a silicon wafer, etc. The adhesive 122 can be any appropriate adhesive, such as a ultraviolet (UV) glue that loses adhesive characteristics when exposed to UV light.

Figure 3:
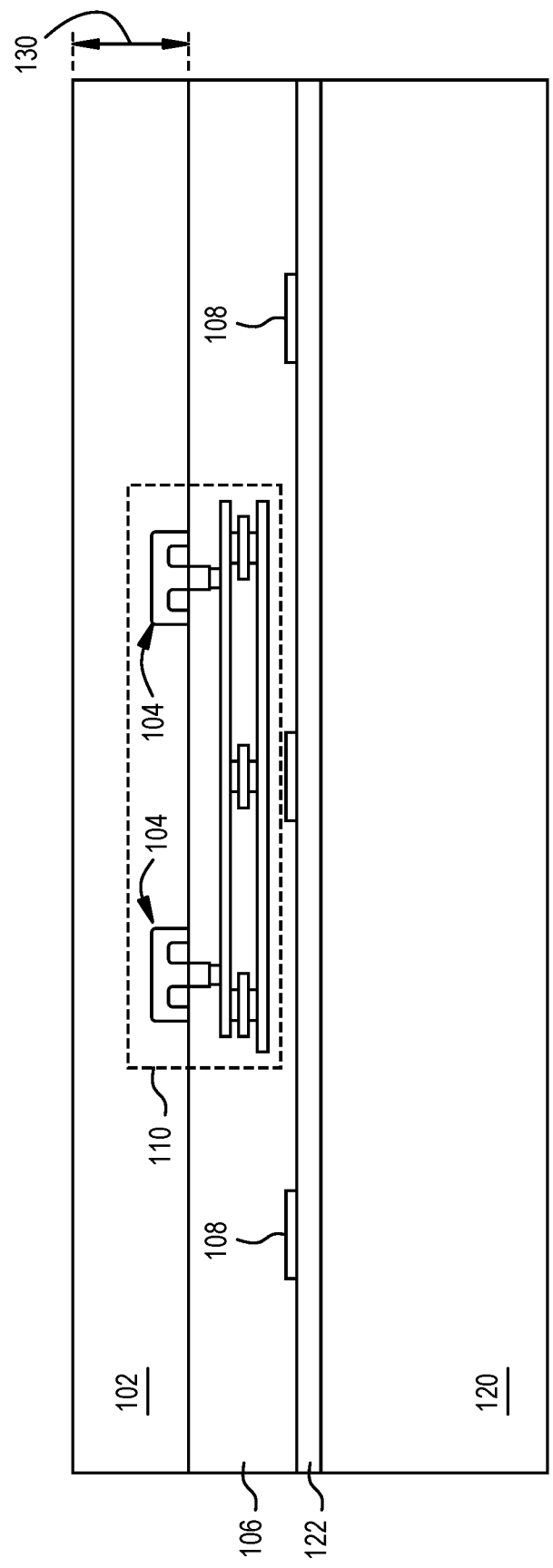

Referring to FIG. 3, the semiconductor substrate 102 is thinned from a backside direction when the semiconductor substrate 102 is mechanically supported by the carrier substrate 120. The semiconductor substrate 102 can be thinned using a chemical mechanical polish (CMP) or other grinding, polishing, or etch process. The semiconductor substrate 102 can be thinned to a thickness 130 in a range from 1 μm to 100 μm, in some examples. The semiconductor substrate 102 can be thinned to other thickness in other examples. The thickness can be any amount such that an electromagnetic radiation blocking layer that is to be disposed on the backside of the semiconductor substrate 102 generally cannot be physically completely removed without the semiconductor substrate 102 becoming fragile and breaking, as will become clearer as described below.

Figure 4A:
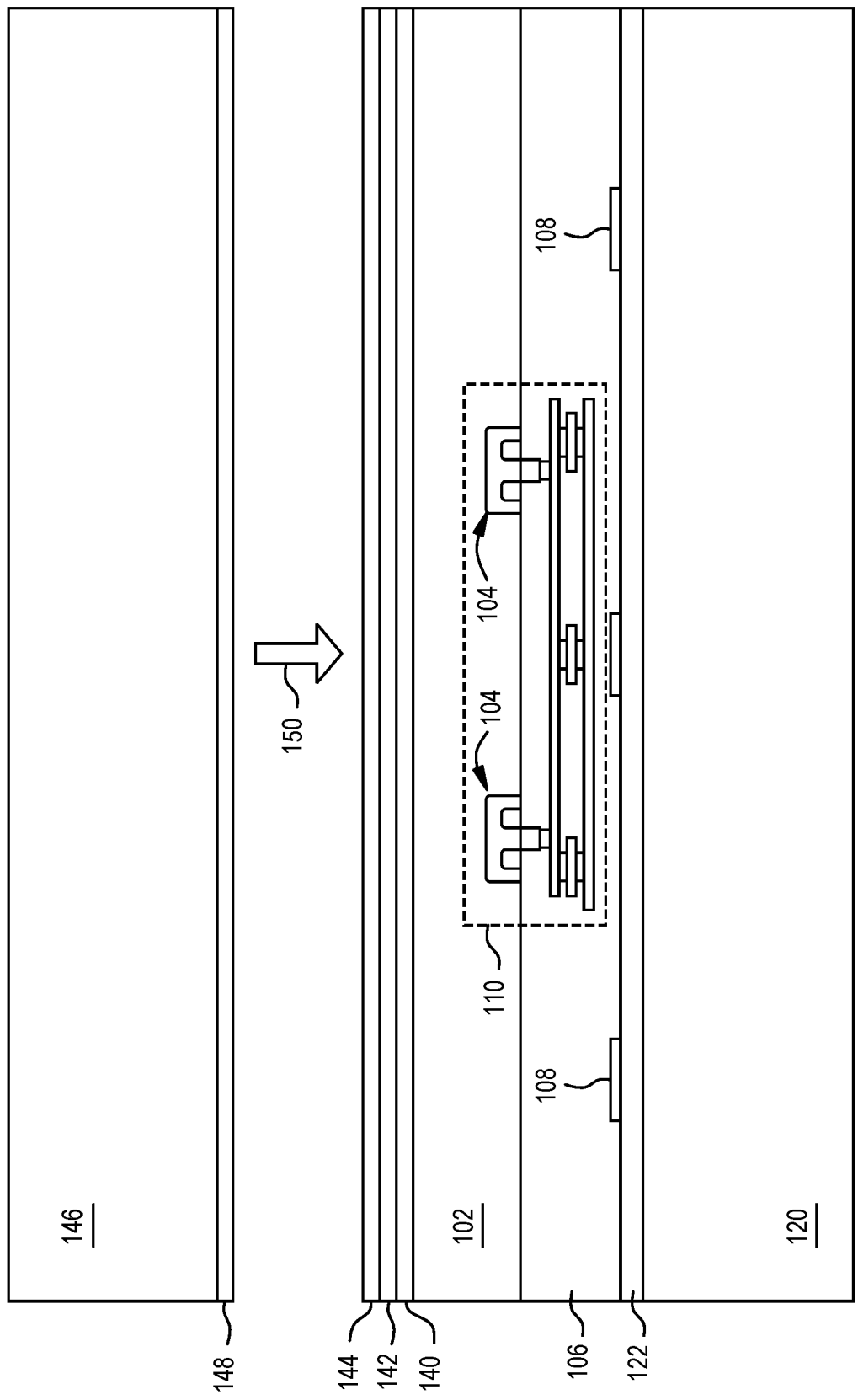

Referring to FIG. 4A, in some examples, an electromagnetic radiation blocking layer 142 is deposited on the backside of the semiconductor substrate 102. As illustrated, other layers can be formed and/or deposited on the backside of the semiconductor substrate 102. As shown, a dielectric layer 140 is formed or deposited on the backside of the semiconductor substrate 102; the electromagnetic radiation blocking layer 142 is deposited on the dielectric layer 140; and a first bonding layer 144 is deposited on the electromagnetic radiation blocking layer 142.

The electromagnetic radiation blocking layer 142 can be any material that is opaque to electromagnetic radiation of a target wavelength or wavelength within a subset of the spectrum of electromagnetic radiation (e.g., infrared (IR) light) and/or that diffuses such electromagnetic radiation sufficiently to obscure features attempted to be imaged or accessed by such electromagnetic radiation through the electromagnetic radiation blocking layer 142. In some examples, the electromagnetic radiation blocking layer 142 can be or include a metal material or metal-containing material. Specific examples of materials for the electromagnetic radiation blocking layer 142 include titanium (Ti), titanium nitride (TiN), tantalum (Ta), tantalum nitride (TaN), and any combination thereof (e.g., multi-layers thereof). The electromagnetic radiation blocking layer 142 can be deposited by a chemical vapor deposition (CVD), physical vapor deposition (PVD), or any other deposition process.

In some examples, the dielectric layer 140 can be omitted (e.g., such that the electromagnetic radiation blocking layer 142 is deposited directly on the semiconductor substrate 102). In examples where the dielectric layer 140 is included, like illustrated, the dielectric layer 140 can be any dielectric material, which may serve a desired purpose. For example, the dielectric layer 140 can be a diffusion barrier layer. If the electromagnetic radiation blocking layer 142 is a layer of metal, the dielectric layer 140 may be a diffusion barrier layer, such as including or being silicon nitride (SiN) or the like, to prevent metal atoms from the electromagnetic radiation blocking layer 142 from diffusing into the semiconductor substrate 102 and potentially degrading the devices 104 formed in the semiconductor substrate 102. In some examples, the dielectric layer 140 can be an adhesion layer, such as including an oxide or the like, that promotes or improves adhesion between the semiconductor substrate 102 and the electromagnetic radiation blocking layer 142. The dielectric layer 140 can be formed by oxidation, CVD, or any other formation or deposition process.

In some examples, the first bonding layer 144 can be omitted. In examples where the first bonding layer 144 is included, like illustrated, the first bonding layer 144 can be any material that promotes or improves bonding, as described subsequently. In some examples, the first bonding layer 144 is or includes a dielectric material, such as an oxide. In further examples, the first bonding layer 144 can also include metal features (e.g., metal pads, such as copper (Cu) pads) at a bonding surface. The first bonding layer 144 can be formed or deposited using CVD, PVD, or other deposition processes. If metal features are included in the first bonding layer 144, the metal features may be deposited using plating, PVD, CVD, or the like.

Additionally, a second bonding layer 148 is formed or deposited on a support substrate 146. The support substrate 146 can be any substrate capable of mechanically supporting the semiconductor substrate 102 and components formed thereon. The support substrate 146 can be, for example, a bulk semiconductor substrate (e.g., a bulk silicon wafer), a glass substrate, an aluminum oxide substrate, or the like. The support substrate 146 can have a thickness in the resulting IC structure that is the original thickness of the support substrate 146 as bonded. In some examples, the support substrate 146 can be thinned, such as by CMP, after bonding to achieve a target thickness of the resulting IC structure. The support substrate 146 can be thicker than the thickness 130 of the semiconductor substrate 102. In some examples, the second bonding layer 148 can be omitted. In examples where the second bonding layer 148 is included, like illustrated, the second bonding layer 148 can be any material that promotes or improves bonding, as described subsequently. In some examples, the second bonding layer 148 is or includes a dielectric material, such as an oxide. In further examples, the second bonding layer 148 can also include metal features (e.g., metal pads, such as copper (Cu) pads) at a bonding surface. The second bonding layer 148 can be formed or deposited using oxidation, CVD, PVD, or other deposition processes. If metal features are included in the second bonding layer 148, the metal features may be deposited using plating, PVD, CVD, or the like.

Figure 5:
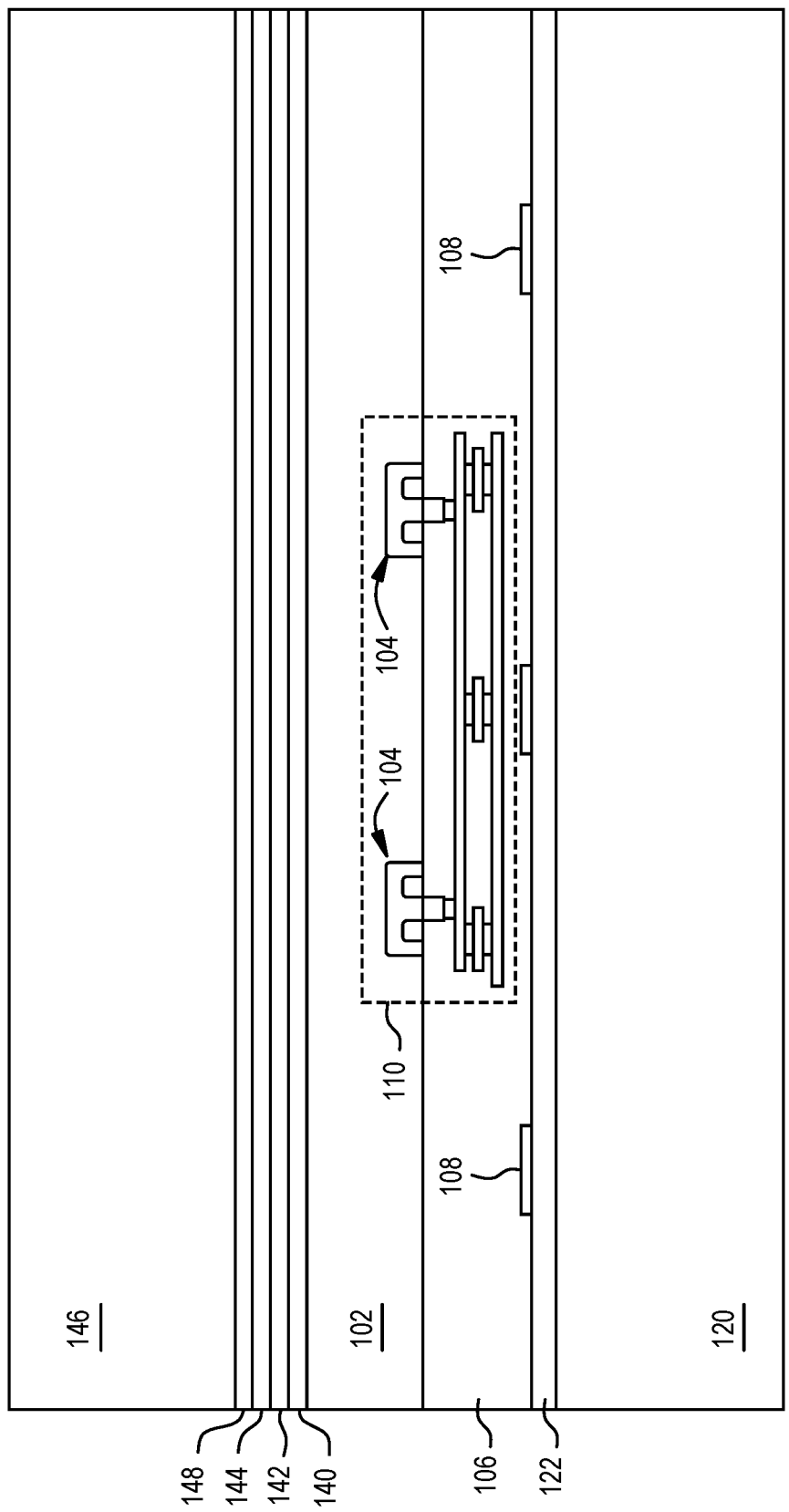

The support substrate 146 is brought together (as indicated by arrow 150) with the backside of the semiconductor substrate 102, and the semiconductor substrate 102 and the support substrate 146 are bonded together, as shown in FIG. 5. In the illustrated example, the first bonding layer 144 and the second bonding layer 148 are contacted and bonded together. A bonding interface is between the first bonding layer 144 and the second bonding layer 148. The bonding is, for example, at the wafer level (e.g., wafer-to-wafer bonding). The bonding can be dielectric-to-dielectric bonding (e.g., oxide-to-oxide bonding), hybrid bonding (e.g., including dielectric-to-dielectric and metal-to-metal bonding), or any other bonding. The bonding mechanism (e.g., dielectric-to-dielectric, hybrid, etc.) can be based on the materials and/or layers implemented at the bonding interface, as would be understood by a person having ordinary skill in the art.

In some specific examples, the dielectric layer 140, electromagnetic radiation blocking layer 142, first bonding layer 144, and second bonding layer 148 are implemented as shown in FIGS. 4A and 5. In the specific examples, each of the dielectric layer 140, the first bonding layer 144, and the second bonding layer 148 is silicon oxide, and the electromagnetic radiation blocking layer 142 is Ti, TiN, Ta, or TaN.

Figure 4B:
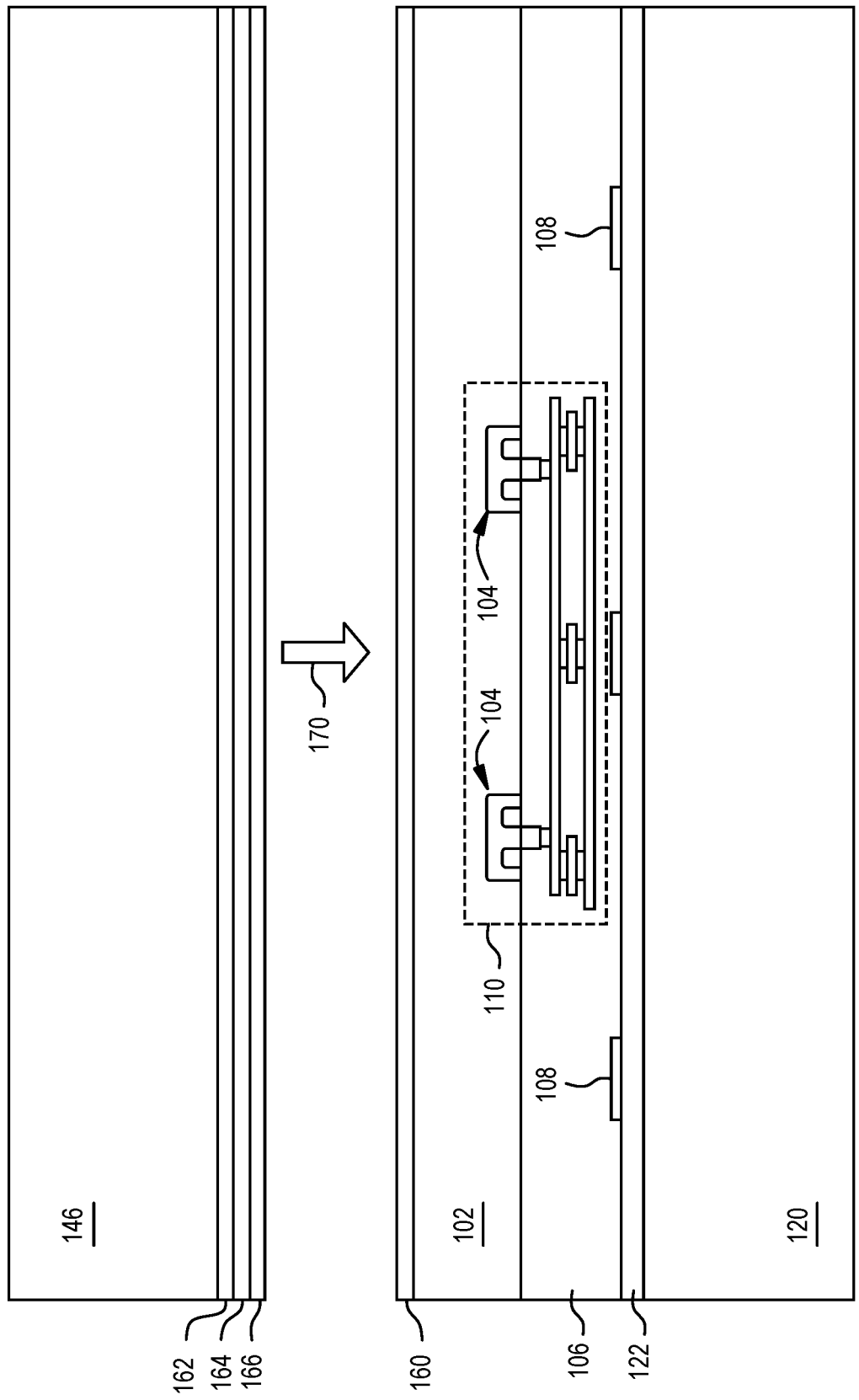

Various modifications relating to which of the semiconductor substrate 102 or support substrate 146 the various layers are formed and/or deposited on can be implemented. FIG. 4B illustrates a variation from FIG. 4A. In FIG. 4B, a first bonding layer 160 is formed or deposited on the backside of the semiconductor substrate 102; a dielectric layer 162 is formed or deposited on the support substrate 146; an electromagnetic radiation blocking layer 164 is deposited on the dielectric layer 162; and a second bonding layer 166 is deposited on the electromagnetic radiation blocking layer 164. These layers can include materials like described above, and can be deposited or formed as described above. Various considerations for the layers (e.g., diffusion, adhesion, bonding, etc.) can be as described above. The support substrate 146 is brought together (as indicated by arrow 170) with the backside of the semiconductor substrate 102, and the semiconductor substrate 102 and the support substrate 146 are bonded together. In the illustrated example, the first bonding layer 160 and the second bonding layer 166 are contacted and bonded together. A bonding interface is between the first bonding layer 160 and the second bonding layer 166. Although the configuration resulting from the processing described with respect to FIG. 4B is not illustrated in subsequent figures, a person having ordinary skill in the art will readily understand how the following description applies to such configuration.

Figure 6:
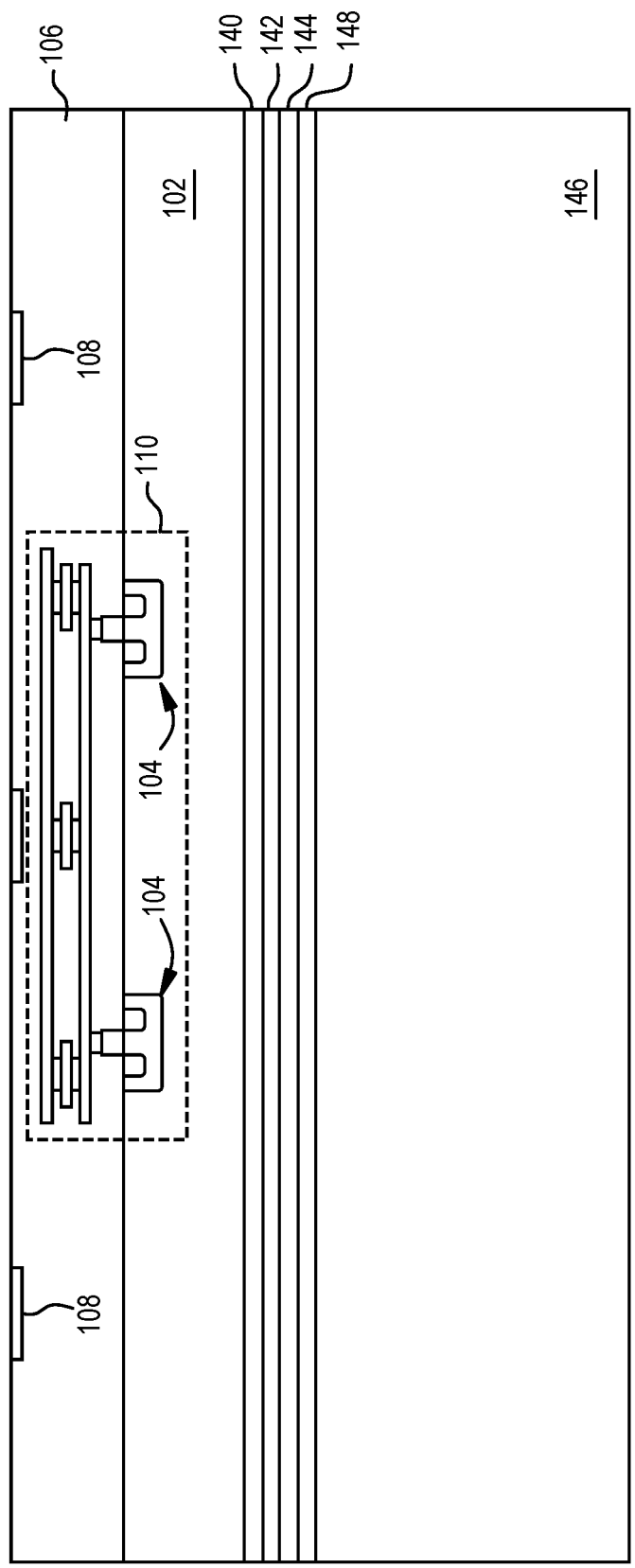

Referring to FIG. 6, after bonding the support substrate 146 to the semiconductor substrate 102, the carrier substrate 120 is released from the semiconductor substrate 102. For example, if the adhesive 122 is a UV glue, the adhesive 122 is exposed to UV light to release the carrier substrate 120 from the semiconductor substrate 102.

Figure 7:
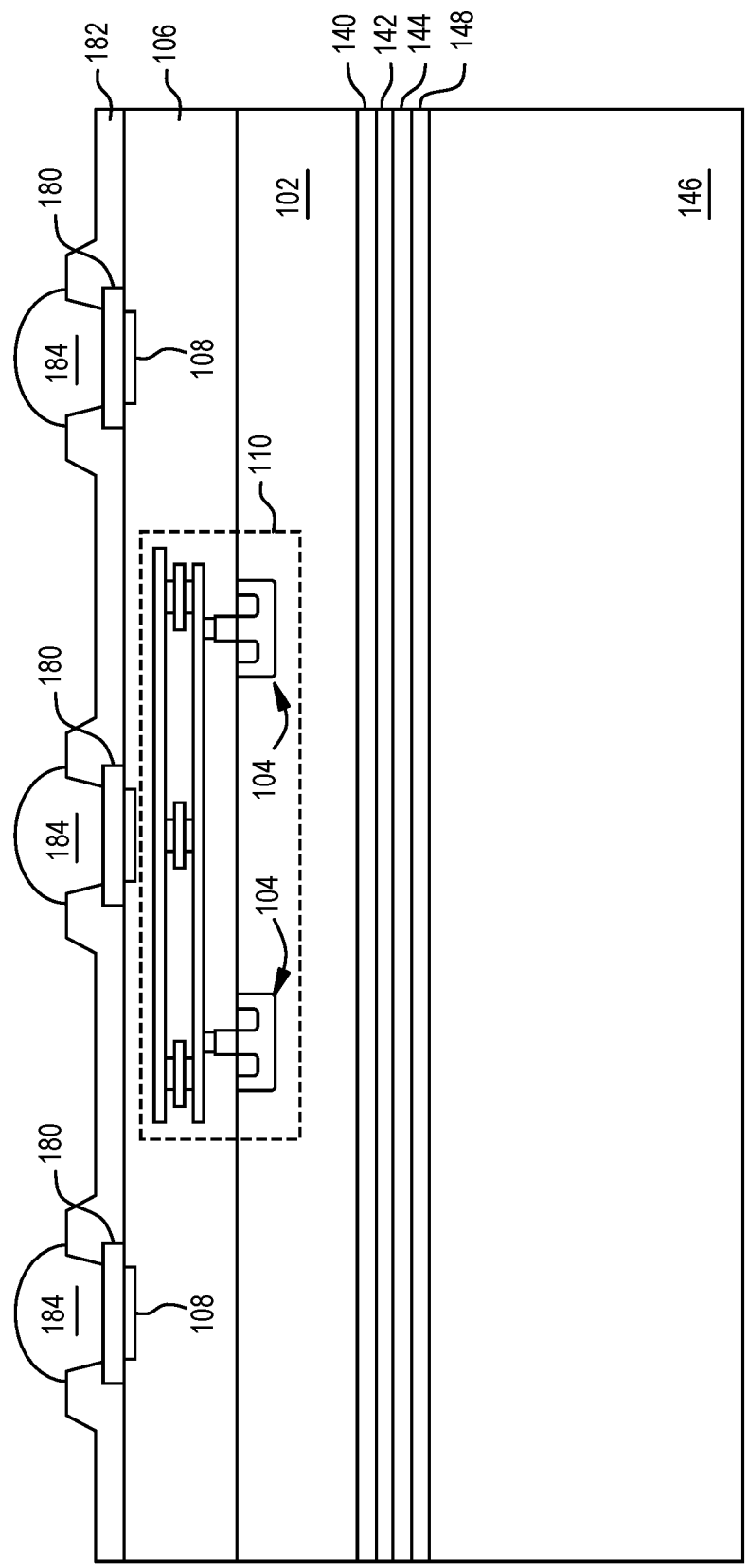

Referring to FIG. 7, exterior electrical connector processing is performed. As illustrated, respective metal pads 180 (e.g., aluminum (Al) pads) are formed on and/or electrically connected to metal features 108, and further, on the interconnect structure 106. A passivation layer 182 is formed on the interconnect structure 106 and over at least laterally outer portions of the metal pads 180. Center portions of the metal pads 180 are exposed through respective openings through the passivation layer 182. Exterior electrical connectors 184 are formed on respective metal pads 180 exposed through the passivation layer 182. The exterior electrical connectors 184 can be, for example, microbumps, controlled collapse chip connection (C4) bumps, or the like. Each exterior electrical connector 184 can be or include solder. Each exterior electrical connector 184 can also include multiple metal layers (e.g., under bump metallization (UBM)), a metal pillar, or the like. Various processing can be used implement the metal pads 180, passivation layer 182, and exterior electrical connectors 184, which is readily understood by a person having ordinary skill in the art, and is therefore omitted for brevity. Other components and/or processing can be implemented as part of the exterior electrical connector processing.

As noted previously, various processing can be performed in different orders. As an example, the metal pads 180 and passivation layer 182 described with respect to FIG. 7 can be formed subsequent to the processing described with respect to FIG. 1 and before adhering the front side of the semiconductor substrate 102 to the carrier substrate 120 in FIG. 2. In such an example, the passivation layer 182 and, possibly, the metal pads 180 are adhered to the adhesive 122. Other modifications can be made.

After the exterior electrical connector processing of FIG. 7, individual IC structures can be singulated (e.g., from the wafer). The singulation may be by sawing or dicing, for example. An individual IC structure can be as illustrated in FIG. 7 and may further be incorporated into an IC package (e.g., including a package substrate, underfill, an encapsulant, etc.). An individual IC structure as illustrated in FIG. 7 can be referred to as an IC die or IC chip, even with the stacked semiconductor substrate 102 and support substrate 146.

As shown in FIG. 7, the electromagnetic radiation blocking layer 142 is disposed on the backside side of the semiconductor substrate 102. Further, the electromagnetic radiation blocking layer 142 is disposed between the semiconductor substrate 102 on which devices 104 and circuit 110 are formed and the support substrate 146. The electromagnetic radiation blocking layer 142 is disposed on the side of the semiconductor substrate 102 opposite from the side of the semiconductor substrate 102 on which the devices 104, the interconnect structure 106, and/or exterior electrical connectors are formed and are disposed.

In some examples, the electromagnetic radiation blocking layer 142 is a blanket layer covering or disposed on an entirety of or throughout the backside of the semiconductor substrate 102 of the IC structure. In some examples, the electromagnetic radiation blocking layer 142 is a blanket layer covering or disposed on less than an entirety of the backside of the semiconductor substrate 102 of the IC structure, such as covering or disposed on only one or more portions of the backside of the semiconductor substrate 102 that align (e.g., vertically in the illustrated orientation) with the circuit(s) on the IC structure that are to be protected. For example, the electromagnetic radiation blocking layer 142 may extend sufficiently laterally to prevent or obscure imaging or access of the circuit(s) to be protected. In further examples, the electromagnetic radiation blocking layer 142 can be patterned while providing sufficient protection to prevent or obscure imaging or access of the circuit(s) to be protected.

In the illustrated examples, the electromagnetic radiation blocking layer 142 is electrically isolated on the backside of the semiconductor substrate 102. For example, when the electromagnetic radiation blocking layer 142 is electrically conductive, such as when the electromagnetic radiation blocking layer 142 is a metal or a metal-containing material, no via (e.g., through-substrate via (TSV)) extends through the semiconductor substrate 102 to electrically connect the electromagnetic radiation blocking layer 142 to a metal feature in the interconnect structure 106 or any device 104 on the front side of the semiconductor substrate 102. Additionally, as illustrated, the electromagnetic radiation blocking layer 142 can have dielectric layers disposed on opposing sides of the electromagnetic radiation blocking layer 142 to further electrically isolate the electromagnetic radiation blocking layer 142. In some examples, the electromagnetic radiation blocking layer 142 may be electrically connected to metal features in the interconnect structure 106 (e.g., by one or more TSVs), such as to ground the electromagnetic radiation blocking layer 142.

If an adverse entity became in possession of the IC structure of FIG. 7 and desired to image or access the circuit 110 or data stored on the circuit 110, the adverse entity can be prevented from imaging the structures or accessing data of the circuit 110 through the backside of the IC structure due to the presence of the electromagnetic radiation blocking layer 142. For the adverse entity to attempt to image the circuit 110 or access the data, the adverse entity would have to attempt to remove the electromagnetic radiation blocking layer 142, which would require removing the support substrate 146 from being bonded to the semiconductor substrate 102. Since the semiconductor substrate 102 has been thinned to a small thickness, it is contemplated that once the support substrate 146 has been removed, the semiconductor substrate 102 (which has been singulated from a larger wafer) would lack the structural integrity to remain intact. That is, the semiconductor substrate 102 would become fragile. The lack of structural integrity would likely result in the semiconductor substrate 102 breaking, which would prevent the adverse entity from being able to image the structures or access data of the circuit 110 formed on the semiconductor substrate 102.

Figure 8:
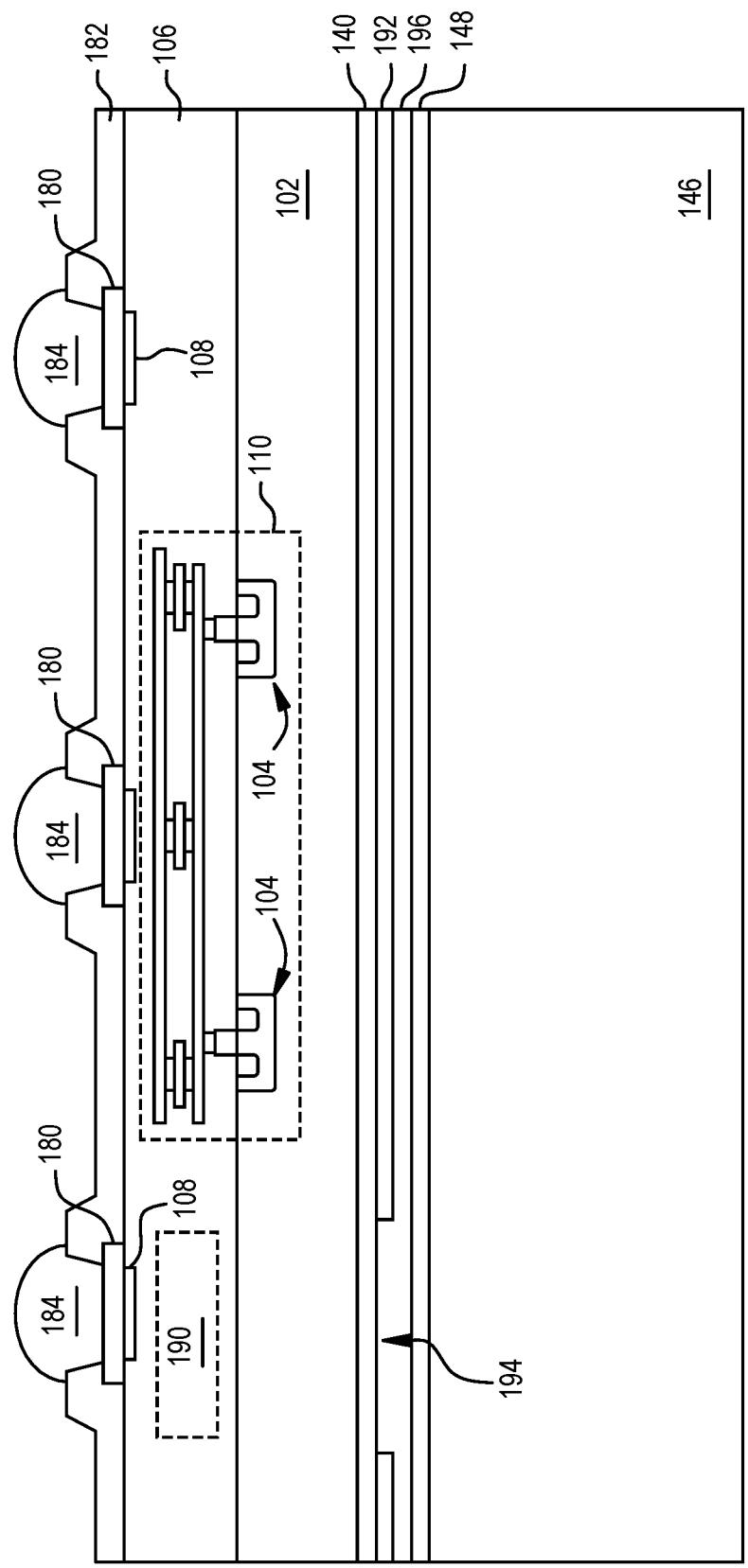
FIG. 8 is a cross-sectional view of another IC structure having a protection scheme according to some examples.

FIG. 8 illustrates a cross-sectional view of an IC structure having a protection scheme according to some examples. The IC structure of FIG. 8 depicts an electromagnetic radiation blocking layer that is patterned, like described above.

A circuit 190 that is not to be protected is formed in the interconnect structure 106. Although the circuit 190 is in the interconnect structure 106 in this example, a circuit not to be protected can be in or include devices formed in or on the semiconductor substrate 102 and/or in the interconnect structure 106. In a specific example, the circuit 190 is or includes an inductor formed of metal features in the interconnect structure 106.

In this example, the dielectric layer 140 is formed or deposited like described above with respect to FIG. 4A, although the dielectric layer 140 may be omitted. An electromagnetic radiation blocking layer 192 is deposited and patterned on the dielectric layer 140. The electromagnetic radiation blocking layer 192 is patterned to have an opening 194 that vertically aligns with the circuit 190. In some examples, the electromagnetic radiation blocking layer 192 can be blanket deposited and subsequently etched using photolithography and etching processes to pattern the electromagnetic radiation blocking layer 192. In some examples, the electromagnetic radiation blocking layer 192 can be deposited patterned, such as by plating. For example, a seed layer can be deposited by PVD on the dielectric layer 140. A photoresist can be deposited and patterned using photolithography, which patterning exposes portions of the seed layer where the electromagnetic radiation blocking layer is to be deposited. The electromagnetic radiation blocking layer can be deposited by plating on the exposed portions of the seed layer. The photoresist can be removed by ashing, and subsequently, remaining exposed portions of the seed layer can be removed by etching. Any other appropriate processes can be used.

A first bonding layer 196 is deposited on the electromagnetic radiation blocking layer 192 and in the opening 194. The first bonding layer 196 fills the opening 194. The first bonding layer 196 can be deposited and can be a same or similar material as described above with respect to the first bonding layer 144. Additionally, the first bonding layer 196 can further be planarized, such as by a CMP, to remove topography that may result from the presence of the opening 194. The planarization may improve the subsequent bonding of the first bonding layer 196 to the second bonding layer 148, like describe above with respect to FIG. 4A.

Various considerations may determine how the electromagnetic radiation blocking layer 192 may or may not be patterned. In the specific example where the circuit 190 is or includes an inductor and the electromagnetic radiation blocking layer 192 is a metal or metal-containing material, the patterning of the electromagnetic radiation blocking layer 192 with the opening 194 may reduce parasitic coupling of the inductor in the circuit 190 compared to if the electromagnetic radiation blocking layer was a blanket layer covering an entirety of the backside of the semiconductor substrate 102. The reduction in parasitic coupling can reduce degradation of the inductor.

The electromagnetic radiation blocking layer can be implemented in an IC structure (e.g., a die or chip) including any circuit. In some examples, the circuit 110 can be or include a field programmable gate array (FPGA). In some examples, the circuit 110 can include an FPGA in addition to other circuits or IP hardblocks. In some examples, the circuit 110 can be a system-on-chip (SoC) or one or more portions of a SoC implemented in the IC structure. Various modification and permutations of circuits, with or without patterning of an electromagnetic radiation blocking layer, can be implemented.

Figure 9:
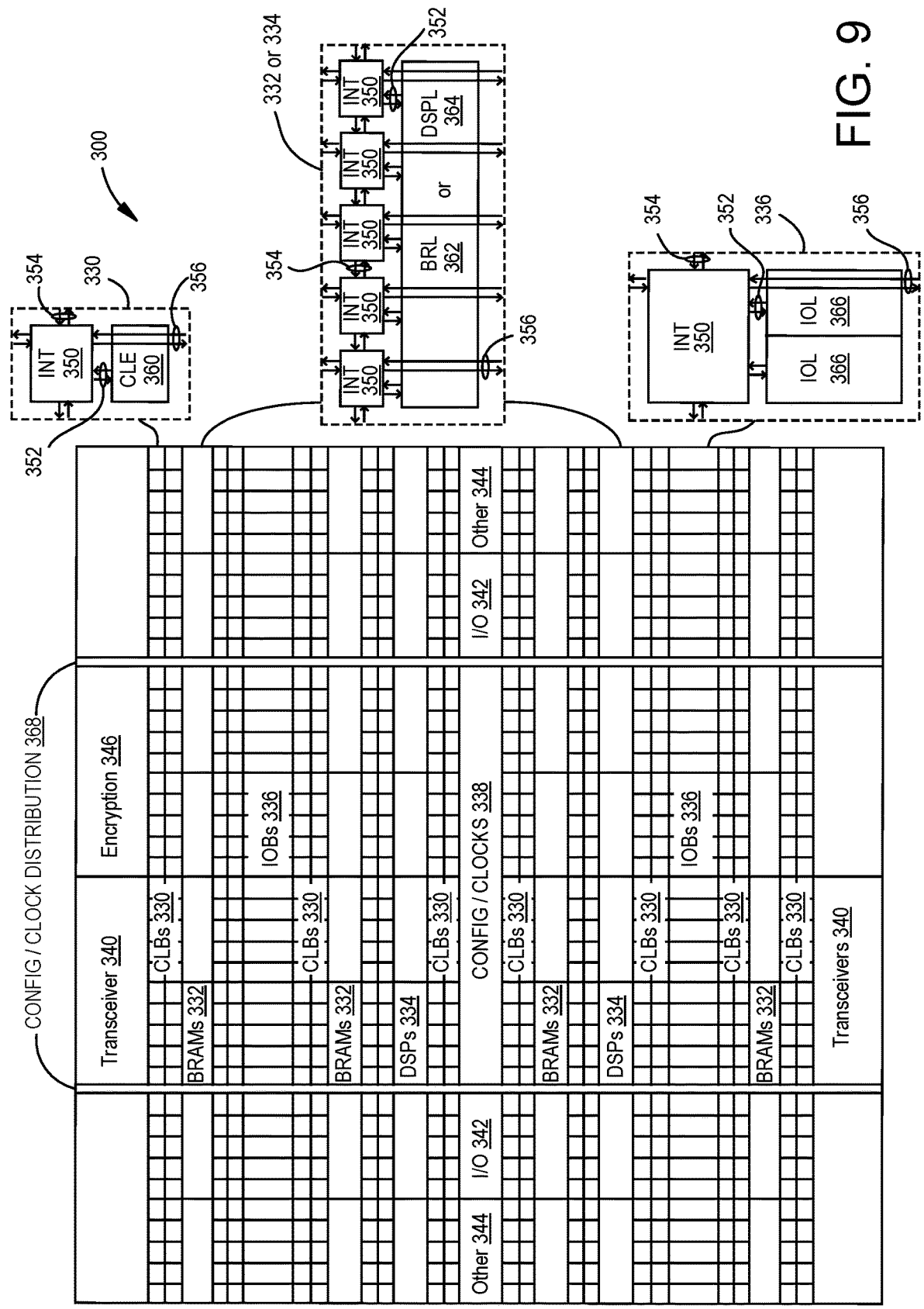
FIG. 9 is a field programmable gate array (FPGA) that may be implemented as a circuit in an IC structure that has a protection scheme according to some examples.

FIG. 9 illustrates a FPGA 300 that may be implemented as the circuit 110 (e.g., in whole or in part) in an IC structure that includes an electromagnetic radiation blocking layer as described above, according to some examples. The various devices (e.g., transistors) of the FPGA 300 can be implemented in and/or on the semiconductor substrate 102 like the devices 104 described above.

The FPGA 300 includes a large number of different programmable tiles (e.g., that form a programmable fabric) including configurable logic blocks (CLBs) 330, random access memory blocks (BRAMs) 332, signal processing blocks (DSPs) 334, input/output blocks (IOBs) 336, configuration and clocking logic (CONFIG/CLOCKS) 338, digital transceivers 340, specialized input/output blocks (I/O) 342 (e.g., configuration ports and clock ports), and other programmable logic 344 such as digital clock managers, system monitoring logic, PCIe interfaces, analog-to-digital converters (ADC), and so forth. The FPGA 300 includes an encryption hardblock 346.

In some FPGAs, each programmable tile can include at least one programmable interconnect element (INT) 350 having connections to input and output terminals 352 of a programmable logic element within the same tile, as shown by examples included in FIG. 9. Each programmable interconnect element 350 can also include connections to interconnect segments 354 of adjacent programmable interconnect element(s) in the same tile or other tile(s). Each programmable interconnect element 350 can also include connections to interconnect segments 356 of general routing resources between logic blocks (not shown). The general routing resources can include routing channels between logic blocks (not shown) comprising tracks of interconnect segments (e.g., interconnect segments 356) and switch blocks (not shown) for connecting interconnect segments. The interconnect segments of the general routing resources (e.g., interconnect segments 356) can span one or more logic blocks. The programmable interconnect elements 350 taken together with the general routing resources implement a programmable interconnect structure (programmable interconnect) for the illustrated FPGA 300.

In an example implementation, a CLB 330 can include a configurable logic element (CLE) 360 that can be programmed to implement user logic plus a single programmable interconnect element (INT) 350. A BRAM 332 can include a BRAM logic element (BRL) 362 in addition to one or more programmable interconnect elements 350. Typically, the number of interconnect elements included in a tile depends on the height of the tile. In the pictured example, a BRAM tile has the same height as five CLBs, but other numbers (e.g., four) can also be used. A signal processing block 334 can include a DSP logic element (DSPL) 364 in addition to an appropriate number of programmable interconnect elements 350. An IOB 336 can include, for example, two instances of an input/output logic element (IOL) 366 in addition to one instance of the programmable interconnect element 350. As will be clear to those of skill in the art, the actual I/O pads connected, for example, to the input/output logic element 366 typically are not confined to the area of the input/output logic element 366.

In the pictured example, a horizontal area near the center of the die is used for configuration, clock, and other control logic. Vertical columns 368 extending from this horizontal area or column are used to distribute the clocks and configuration signals across the breadth of the FPGA.

Some FPGAs utilizing the architecture illustrated in FIG. 9 include additional logic blocks that disrupt the regular columnar structure making up a large part of the FPGA. The additional logic blocks can be programmable blocks and/or dedicated logic.

Note that FIG. 9 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 9 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. An integrated circuit (IC) structure comprising:
a semiconductor substrate having a circuit disposed on a front side of the semiconductor substrate;
a diffusion barrier layer disposed on a backside of the semiconductor substrate;
an electromagnetic radiation blocking layer disposed on the diffusion barrier layer and on the backside of the semiconductor substrate opposite from the front side of the semiconductor substrate, wherein the electromagnetic radiation blocking layer is a blanket layer covering an entirety of the backside of the semiconductor substrate; and
a support substrate bonded to the semiconductor substrate, the electromagnetic radiation blocking layer being disposed between the semiconductor substrate and the support substrate.

2. The IC structure of claim 1, wherein the electromagnetic radiation blocking layer is a patterned layer on the backside of the semiconductor substrate.

3. The IC structure of claim 1, wherein the electromagnetic radiation blocking layer includes a material that is opaque to infrared (IR) light.

4. The IC structure of claim 1, wherein the electromagnetic radiation blocking layer includes titanium, titanium nitride, tantalum, tantalum nitride, or a combination thereof.

5. The IC structure of claim 1 further comprising an interconnect structure disposed on the front side of the semiconductor substrate, the circuit comprising one or more devices disposed at least partially in the semiconductor substrate and one or more metal features disposed in the interconnect structure, the electromagnetic radiation blocking layer being electrically isolated from the interconnect structure.

6. The IC structure of claim 1, wherein a thickness of the semiconductor substrate is in a range from 1 µm to 100 µm.

7. A method for forming an integrated circuit (IC) structure, the method comprising:
forming a circuit on a front side of a semiconductor substrate;
forming a diffusion barrier layer on a backside of the semiconductor substrate;
bonding a support substrate to the backside of the semiconductor substrate opposite from the front side of the semiconductor substrate; and
depositing an electromagnetic radiation blocking layer on the diffusion barrier layer and on the backside of the semiconductor substrate between the semiconductor substrate and the support substrate before bonding the support substrate to the semiconductor substrate, wherein, after bonding the support substrate to the semiconductor substrate, the electromagnetic radiation blocking layer is a blanket layer covering an entirety of the backside of the semiconductor substrate.

8. The method of claim 7, wherein, after bonding the support substrate to the semiconductor substrate, the electromagnetic radiation blocking layer is a patterned layer on the backside of the semiconductor substrate.

9. The method of claim 7 further comprising thinning the semiconductor substrate from the backside of the semiconductor substrate before bonding the support substrate to the semiconductor substrate.

10. The method of claim 7, wherein the electromagnetic radiation blocking layer includes a material that is opaque to infrared (IR) light.

11. The method of claim 7, wherein the electromagnetic radiation blocking layer includes titanium, titanium nitride, tantalum, tantalum nitride, or a combination thereof.

12. A method for forming an integrated circuit (IC) structure, the method comprising:
forming a circuit on a front side of a semiconductor substrate;
forming a diffusion barrier layer on a backside of the semiconductor substrate;
thinning the semiconductor substrate from the backside of the semiconductor substrate opposite from the front side of the semiconductor substrate;
forming an electromagnetic radiation blocking layer on the diffusion barrier layer and on the backside of the semiconductor substrate; and
after forming the electromagnetic radiation blocking layer, bonding a support substrate to the backside of the semiconductor substrate, wherein the electromagnetic radiation blocking layer is disposed between the semiconductor substrate and the support substrate, wherein, after bonding the support substrate to the semiconductor substrate, the electromagnetic radiation blocking layer is a blanket layer covering an entirety of the backside of the semiconductor substrate.

13. The method of claim 12 further comprising:
forming a first bonding layer on the electromagnetic radiation blocking layer; and
forming a second bonding layer on the support substrate, wherein bonding the support substrate to the backside of the semiconductor substrate comprises bonding the second bonding layer to the first bonding layer.

14. The method of claim 12, wherein forming the electromagnetic radiation blocking layer includes patterning the electromagnetic radiation blocking layer.

15. The method of claim 12, wherein the electromagnetic radiation blocking layer includes a material that is opaque to infrared (IR) light.

* * * * *